(12) United States Patent
Ichikawa et al.

(10) Patent No.: US 7,052,402 B2
(45) Date of Patent: May 30, 2006

(54) SHAFT AND MANUFACTURING METHOD THEREOF

(75) Inventors: Kazuyuki Ichikawa, Okazaki (JP); Tomonori Ohwaki, Kariya (JP); Hiroki Yamato, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/673,155

(22) Filed: Sep. 30, 2003

(65) Prior Publication Data
US 2004/0063506 A1 Apr. 1, 2004

(30) Foreign Application Priority Data
Sep. 30, 2002 (JP) ............................. 2002-286481

(51) Int. Cl.
*F16D 1/06* (2006.01)
(52) U.S. Cl. ..................................... 464/182; 403/359.6
(58) Field of Classification Search ................ 464/156, 464/158, 159, 182, 905, 906; 403/359.1, 403/359.6
See application file for complete search history.

(56) References Cited

U.S. PATENT DOCUMENTS

| | | | |
|---|---|---|---|
| 2,714,809 A | * | 8/1955 | Voss ..................... 403/359.6 X |
| 3,024,626 A | | 3/1962 | Frischman |
| 3,832,076 A | * | 8/1974 | Gehrke |
| 4,061,433 A | * | 12/1977 | Chave ..................... 403/359.6 |
| 4,275,571 A | | 6/1981 | Welschof |
| 4,392,839 A | * | 7/1983 | Aucktor .................. 464/182 X |
| 4,552,544 A | * | 11/1985 | Beckman et al. .... 403/359.6 X |
| 6,319,337 B1 | | 11/2001 | Yoshida et al. |
| 6,685,572 B1 | * | 2/2004 | Makino et al. ............. 464/182 |
| 2003/0125116 A1 | * | 7/2003 | Breese et al. ................ 464/159 |

FOREIGN PATENT DOCUMENTS

| | | |
|---|---|---|
| EP | 1 016 801 | 7/2000 |
| JP | 57-41840 | 3/1982 |
| JP | 9-42303 | 2/1997 |
| JP | 2001-206004 | 7/2001 |

* cited by examiner

*Primary Examiner*—Greg Binda
(74) *Attorney, Agent, or Firm*—Oblon, Spivak, McClelland, Maier & Neustadt, P.C.

(57) ABSTRACT

A shaft has a shank with a splined portion and a large diameter portion formed in an outer peripheral surface of the shank, the large diameter portion having a diameter that is larger than a diameter of an external periphery of the splined portion. A tapered portion is provided at a side surface of the large diameter portion on the splined portion side. This tapered portion stops a fitting member that is fitted onto the splined portion. In addition, a cut back portion formed at an end portion of the splined portion at the large diameter portion side and the tapered portion are interposed by and continuously connected by a first curved portion, a flat portion and a second curved portion.

7 Claims, 7 Drawing Sheets

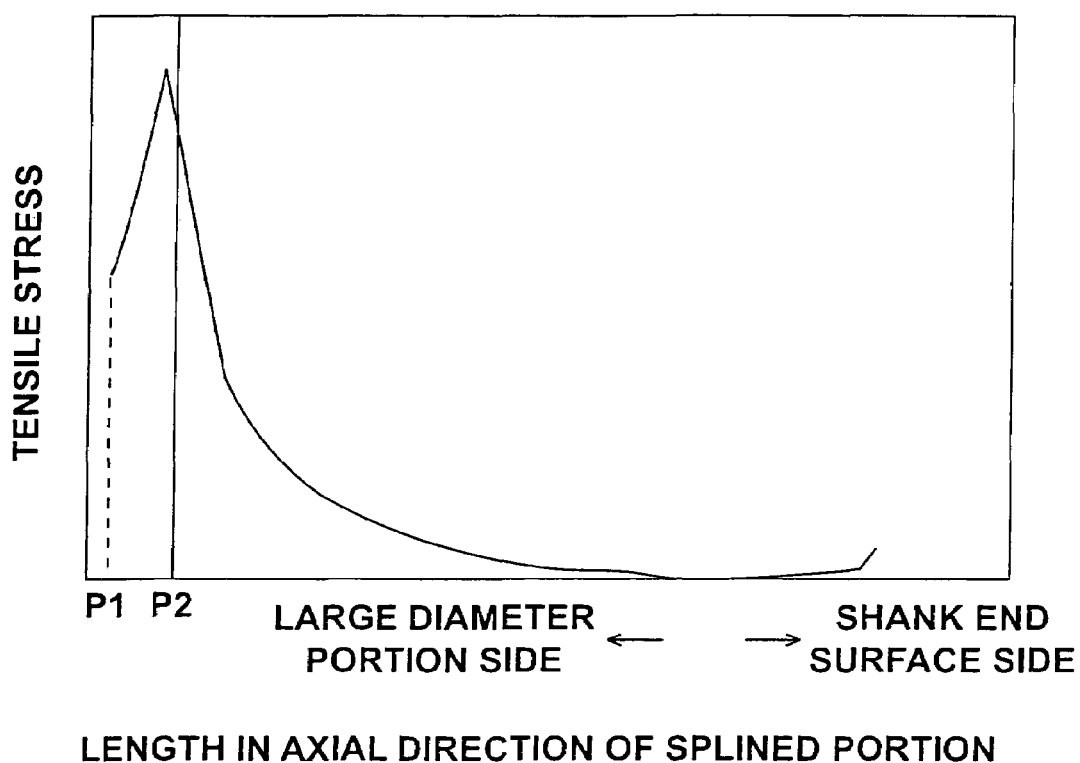

FIG. 8(a)
GENERATED STRESS RATIOS
|  | A | B | C |
|---|---|---|---|
| FIRST EMBODIMENT | 0.92 | 0.00 | 0.86 |
| SECOND EMBODIMENT | 0.84 | 0.79 | 0.80 |
| THIRD EMBODIMENT | 0.83 | 0.95 | 0.73 |
| FOURTH EMBODIMENT | 0.84 | 0.89 | 0.84 |
| CONVENTIONAL EXAMPLE | 1.00 |  | 0.82 |
FIG. 8(b)
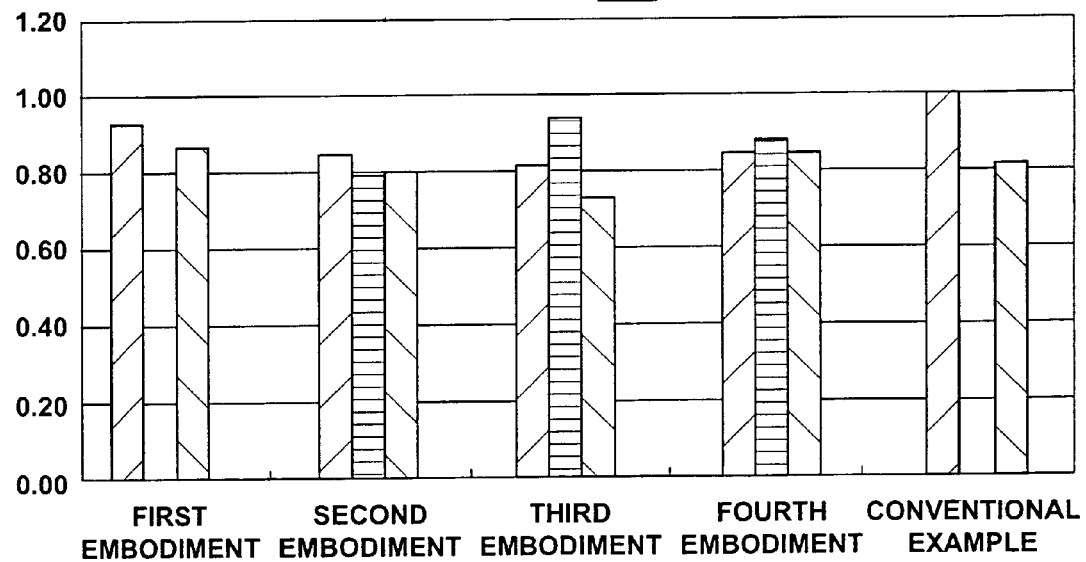

SHAFT AND MANUFACTURING METHOD THEREOF

INCORPORATION BY REFERENCE

The disclosure of Japanese Patent Application No. 2002-286481 filed on Sep. 30, 2002 including the specification, drawings and abstract is incorporated herein by reference in its entirety.

BACKGROUND OF THE INVENTION

1. Field of the Invention

The present invention relates to a shaft that is installed in an automobile and in various types of industrial machine and a manufacturing method thereof.

2. Description of the Related Art

Conventionally, a shaft used in a constant velocity joint, or the like, has a shank having a splined portion provided at an outer peripheral surface. Furthermore, a large diameter portion having a diameter larger than a diameter of the outer periphery of the splined portion is provided at an end portion of the splined portion in the direction that a fitting member such as an inner race is inserted onto the splined portion. When the fitting member is fitted, the large diameter portion acts as a stopper for stopping the fitting member.

In order to make this type of shank, first, as shown in FIG. 9 (*a*), a shank 100 having a main portion 105 with a constant radius with respect to a shaft axis; a slanted portion 102; and a large diameter portion 101 is prepared. The slanted portion 102, as shown in FIG. 9 (*b*), is formed from a tapered portion 102*a* and a curved portion 102*b* that extend continuously from a portion adjacent to the large diameter portion 101.

When this shank 100 is machine formed, as shown in FIG. 10 (*a*), a small diameter portion 103 and a splined portion 104 are formed in the main portion 105 in this order, from the larger diameter 101 portion side thereof. The small diameter portion 103 is provided so as to inhibit interference between the large diameter portion 101 and cutting tool when the splined portion 104 is being machined. In addition, the diameter of the small diameter portion 103 is constant along its entire length. Further, normally, the diameter of the small diameter portion 103 is larger than a diameter of a groove portion 104*a* of the splined portion 104, and smaller than a diameter of the main portion 105 prior to machining of the splined portion 104, A cut back portion 104*b* is formed at a portion that runs from the groove portion 104*a* of the splined portion 104 to the small diameter portion 103. This cut back portion 104*b*, as shown in FIG. 10 (*b*), is formed from a tapered portion 104*b*2 and a curved portion 104*b*1 that extend successively from the small diameter portion 103 side.

As shown in FIG. 11, a fitting member 200, which acts as an inward joint member of the constant velocity joint, having a splined portion 204 that faces the large diameter portion 101 is fitted onto the shank 100 configured as described above. At this time, the fitting member 200 abuts with the slanted portion 102. When this occurs, load is applied from the fitting member 200 to the slanted portion 102 (in the direction shown by the arrow in FIG. 10(*b*)). Moreover, in the constant velocity joint, load applied to a tooth flank of the splined portion 104 is applied to the cut back portion 104*b* and stress concentration occurs between the cut back portion 104*b* and the small diameter portion 103.

In order to more fully understand the state of this stress concentration with the above described conventional shaft, as an example, FIG. 7 shows tensile stress exerted in the direction along with the shaft axis of the shank 100 when the fitting member 200 is fitted. It should be noted that, as shown in FIG. 11, a starting position on the side of the large diameter portion 101 of the splined portion 104 of the shank 100 is taken as P1, and a fitting starting position of the splined portion 104 for fitting with the fitting member 200 is taken as P2.

As shown by FIG. 7, it is clear that substantial tensile stress is exerted in an area between P1 and P2, and in the area from P2 to the vicinity of the shank end surface side.

Accordingly, a structure has been proposed in Japanese Patent Publication Laid-Open No. Hei. 09-042303 paragraph [0015] and [0016], and FIG. 2 for reducing this stress concentration of the small diameter portion 103 between the cut back portion 104*b* and the large diameter portion 101.

This structure is configured such that a smooth portion with a diameter smaller than the groove portion 104*a* of the splined portion 104 is provided at the small diameter portion 103.

However, although stress concentration in the vicinity of the cut back portion 104*b* is reduced in the case of the invention disclosed in Patent JP 09-042303, the portion with the small diameter is formed in the shank itself. In other words, the smooth portion with the diameter smaller than the diameter of the groove portion 104*a* of the splined portion 104 is formed in the shank, and thus the strength of the shank is impaired.

SUMMARY OF THE INVENTION

In light of the aforementioned circumstances, it is an object of the present invention to provide a shaft that can reduce stress concentration that occurs locally whilst maintaining strength of a shank, and to provide a manufacturing method that allows easy manufacturing of such a shaft.

In order to achieve the above objects, according to a first aspect of the present invention, a shaft includes a shank with a splined portion that is spline engaged with a fitting member, and an external diameter portion that is formed separately from the splined portion, both the splined portion and the external diameter portion being formed in an outer peripheral surface of the shank. This shaft is provided with any one of a curved portion; a plurality of curved portions; and a plurality of curved portions and at least one straight portion, that extend continuously so as to connect a cut back portion formed at an end portion of a groove portion of the splined portion and the external diameter portion.

It should be noted that in the present invention, the term "splined portion" indicates a portion provided with a plurality of slots that are formed parallel to a shaft axis of the shank, or a portion that has serrations with an inverted triangular chevron cross-sectional shape.

A shaft according to the first aspect of the present invention may be formed with a large diameter portion which has a diameter that is larger than a diameter of an external periphery of the splined portion at an end portion of the external diameter portion of the shaft at the splined portion side. Further, a tapered portion which stops the fitting member may be provided at a side surface of the large diameter portion at the splined portion side.

In addition, the shaft according to the first aspect of the present invention may be provided with an end portion at the external diameter portion side of the shaft of the curved portion. This end portion is formed so as to be further from the shaft axis of the shank than the cut back portion.

Moreover, the shaft according to the first aspect of the present invention may be provided with two of the curved portions.

In addition, the shaft according to the first aspect of the present invention may be provided with two of the straight portions.

As a result of the above, the first aspect and its various configurations allow the strength of the shank itself to be maintained while reducing stress concentration that occurs locally.

According to a second aspect of the present invention, a manufacturing method for manufacturing the shaft according to the first aspect or any of its configurations, includes the steps of: forming the splined portion with a predetermined shape by cold forging, machining and component rolling; forming the curved portion by component rolling; and conducting quenching.

In addition, according to the second aspect of the present invention, a step of shot peening may be conducted after conducting quenching.

As a result of the above, the configurations of the second aspect of the present invention make it possible to easily manufacture the aforementioned shaft.

BRIEF DESCRIPTION OF THE DRAWINGS

FIG. 7 is a graph showing a relationship of length in an axial direction and tensile strength of a conventional shaft;

FIG. 8 (*a*) is a chart showing applied stress ratios for each portion of respective shafts of the first to fourth embodiments;

FIG. 8 (*b*) is a graph showing applied stress ratios for each portion of respective shafts of the first to fourth embodiments;

FIG. 9 (*b*) is an enlarged portional side view of a conventional shaft prior to machining;

FIG. 10 (*b*) is a further enlarged portional side view of the same conventional shaft.

DETAILED DESCRIPTION OF THE PREFERRED EMBODIMENTS

First Embodiment

Hereinafter, a first embodiment, which is a concrete embodiment of the present invention as a shaft for a universal joint, namely, a tripod joint, will be explained in detail with reference to FIG. 1 and FIG. 2.

Figure 1:
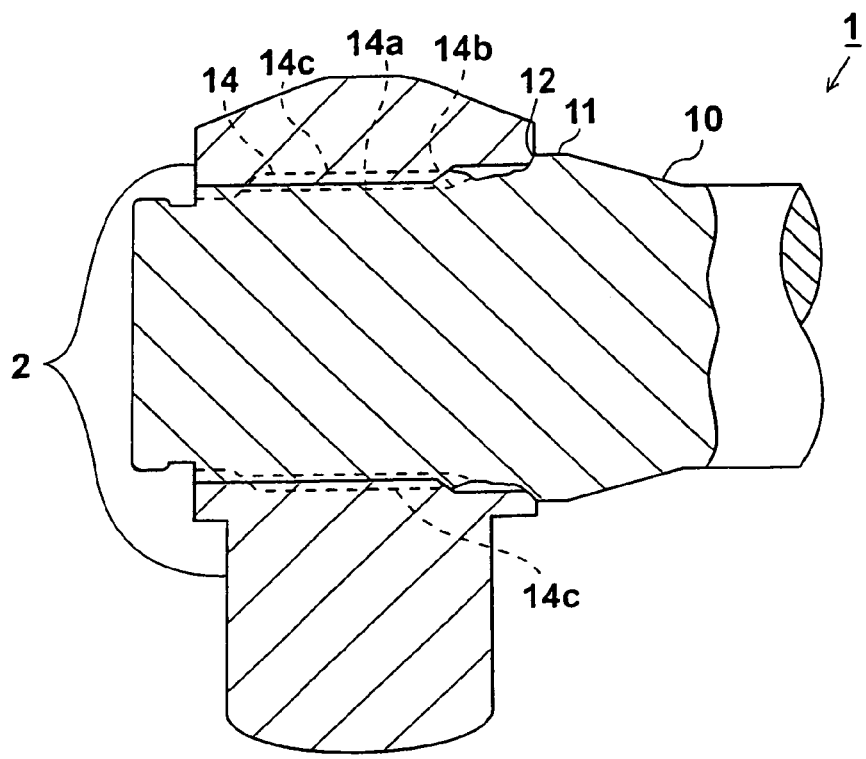
FIG. 1 is a cross sectional view of a portion of a shaft according to a first embodiment.

As shown in FIG. 1, a shank 10 is provided at an end of a shaft 1. A splined portion 14 and a large diameter portion 11 which acts as an outer diameter portion and which is positioned separately from the splined portion 14 are formed on the shank 10. This large diameter portion 11 has a diameter that is larger than an outer periphery of the splined portion 14.

In this embodiment, in the splined portion 14, a plurality of slots (hereinafter referred to as "groove portion 14*a*") are formed in parallel to a shaft axis of the shank 10, and a plurality of splines 14*c* are formed along a circumferential direction of the shank 10. A radius of the groove portion 14*a* is constant with respect to the shaft axis of the shank 10, with the exception of an end portion near to the large diameter portion 11.

In addition, an inward joint member 2 of the tripod joint, which acts as a fitting member, is press fitted to the splined portion 14.

A tapered portion 12 that stops the inward joint member 2 is provided in a side surface of the large diameter portion 11 on the splined portion 14 side. This tapered portion 12 is formed such that its diameter with respect to the shaft axis of the shank 10 becomes smaller in a linear manner, as the tapered portion 12 extends from an external peripheral surface of the large diameter portion 11 toward the splined portion 14 side. Moreover, an end portion of the tapered portion 12 at the splined portion 14 side will be referred to as a "small diameter end portion".

Figure 2:
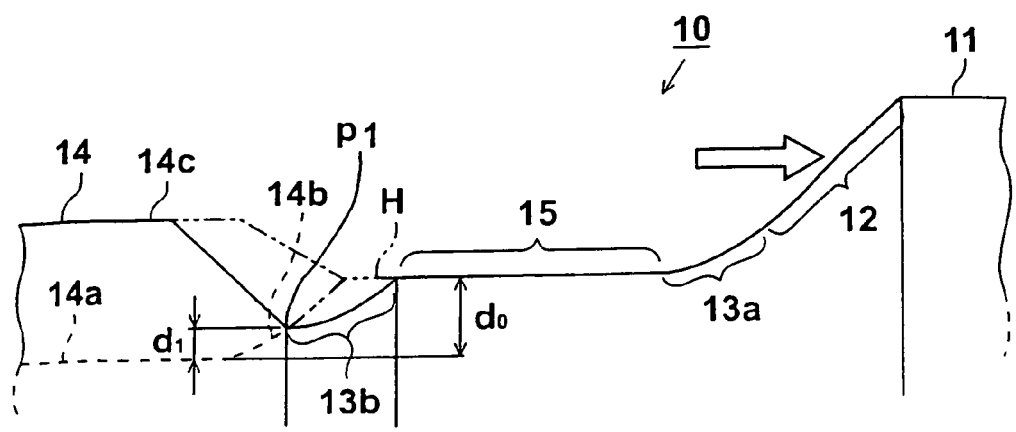
FIG. 2 is an enlarged side view of the same portion as FIG. 1.

As shown in FIG. 2, the end portion of the groove portion 14*a* near to the large diameter portion 11 is formed as a curved portion, namely, a cut back portion 14*b*, that extends continuously with a second curved portion 13*b* at a position P1 where the splines and grooves of the splined portion diametrically converge. Accordingly, there is a diameter difference d1 between the diameter of a portion of the groove portion 14*a* of the splined portion 14, excluding the cut back portion 14*b*, and the minimum diameter of the end portion of the second curved portion 13*b* near to the splined portion 14.

Furthermore, a first curved portion 13*a* as a curved portion; a flat portion 15 that is a straight portion that has a diameter that is constant with respect to the shaft axis; and the second curved portion 13*b* as a curved portion, are provided in this order from the tapered portion 12 side, so as to extend continuously and be interposed in a further portion in the space between the small diameter end portion of the tapered portion 12 and the cut back portion 14*b*. In other words, two curved portions and one straight portion are provided between the cut back portion 14*b* and the tapered portion 12. The curved portion 13*a* is an extension of, and provides a transition for, the tapered portion 12.

The end portions of the first and second curved portions 13*a* and 13*b* at the large diameter 11 side are formed so as to have respective radiuses with respect to (distance from) the shaft axis of the shank 10 that are larger than that of the cut back portion 14*b*.

Next, a manufacturing method of the shaft 1 will be explained.

First, the shank 10 is manufactured as was explained with reference to the conventional art as shank 100. In addition, by conducting cold forging, machining and component rolling, the splined portion 14 is formed so as to have a predetermined shape. At this time, the groove portion 14*a*, including the cut back portion 14*b*, is formed.

Following this, the second curved portion 13*b*, the flat portion 15 and the first curved portion 13*a* are formed by conducting component rolling. The forming of each of these portions is executed continuously in order.

Following this, quenching is executed, and then shot peening of the portion including the second curved portion 13b, the flat portion 15, the first curved portion 13a and the tapered portion 12 is conducted.

Next, the operation of the shaft 1 having the aforementioned configuration will be explained.

As described previously, the first curved portion 13a, the flat portion 15, and the second curved portion 13b are provided so as to interpose between the tapered portion 12 and the cut back portion 14b.

Load is applied to the tapered portion 12 along the direction of the shaft axis of the shank 10 (the direction indicated by the arrow shown in FIG. 2) by the inward joint member 2. Accordingly, this load is not dispersed over the surface that is parallel to the load application direction, namely, the flat portion 15. However, the load is transmitted to the first and second curved portions 13a and 13b from the tapered portion 12. As a result, stress concentration occurrence in the tapered portion 12 is reduced.

Furthermore, by providing both the first curved portion 13a and the second curved portions 13b between the tapered portion 12 and the cut back portion 14b, the diameter difference d1 is reduced as compared to that of the conventional shank.

In FIG. 2, the externality of the conventional shaft, which is configured by splined portion 104 and small diameter portion 103, is indicated by two-dotted chain line. Further, text H indicates the size of the small diameter portion 103 of the conventional shaft. As can be seen from FIG. 2, there is a diameter difference d0 between the diameter of the conventional groove portion of the splined portion and the diameter H of the small diameter portion of the conventional shaft on the splined portion side.

As a result, as compared to the conventional shank, the size in the radial direction of the cut back portion 14b is made smaller. Accordingly, strength of a diameter periphery portion of a spline pitch circle is reduced as compared to the conventional shank, and the splines 14c become easier to bend in a circumferential direction of the shank 10.

As a result, during the operation of the tripod joint, when the tooth flanks of the splines 14c are subjected to load, an external periphery end portion of the splined portion 14 bends in the direction of the subjected load to absorb the subjected load. In this manner, the load applied to the tooth flanks of the splines 14c is reduced, and thus the stress concentration that occurs in the cut back portion 14b is reduced.

Moreover, by adjusting the diameter difference d1 such that the load applied in the circumferential direction of the splined portion 14 is applied to the tooth flanks of the splines 14c, it is possible to further reduce the load that is applied to the cut back portion 14b.

As a result, the following effects can be obtained with the shaft 1 and the manufacturing method of the first embodiment:

(1) According to the first embodiment, the cut back portion 14b of the splined portion 14 and the tapered portion 12 are continuously connected by the two curved portions, namely, the first and second curved portions 13a and 13b, and the one flat portion 15.

Accordingly, the strength of the shank 10 itself can be maintained while reducing stress concentration that occurs locally.

(2) Furthermore, the respective end portions of the first and second curved portions 13a and 13b at the large diameter portion 11 side are formed to have larger radiuses with respect to (distance from) the shaft axis of the shank 10 than that of the cut back portion 14b. Accordingly, the diameter of the shank 10 gradually expands from the cut back portion 14b to the tapered portion 12, and thus it is possible to maintain the strength of the shank 10 itself while reducing stress concentration that occurs locally.

(3) In addition, in the first embodiment, both the first curved portion 13a and the second curved portion 13b are provided. Accordingly, the diameter of the shank 10 gradually expands in a stepped manner from the cut back portion 14b to the tapered portion 12. As a result, it is possible to maintain the strength of the shank 10 itself while reducing stress concentration that occurs locally.

(4) Furthermore, the shaft according to the first embodiment is manufactured by a method in which the splined portion 14 is formed in a predetermined shape by conducting cold forging, machining and component rolling. Following this, the first curved portion 13a, the flat portion 15 which is a straight portion and the second curved portion 13b are formed using component rolling. Then, quenching is executed. Accordingly, it is possible to form the portion between the tapered portion 12 and the cut back portion 14b with a single execution of component rolling. Thus, a simple manufacturing method is provided that allows manufacture of a shaft that provides the effects described in (1) to (3) above.

(5) Moreover, following quenching, shot peening is executed. Accordingly, this simple manufacturing method makes it possible to improve the fatigue strength of the shaft 1.

Second Embodiment

Next, a shaft according to a second embodiment of the invention will be explained with reference to FIG. 3. It should be noted that in the explanation of the second embodiment, and the other following embodiments, structural members that are the same as those of the first embodiment will be denoted with the same reference characters and their explanation omitted. Accordingly, only points of difference will be explained. Moreover, since the manufacturing method of respective shafts 1 of each of the following embodiments is the same as that of the first embodiment, an explanation of this manufacturing method will be omitted.

Figure 3:
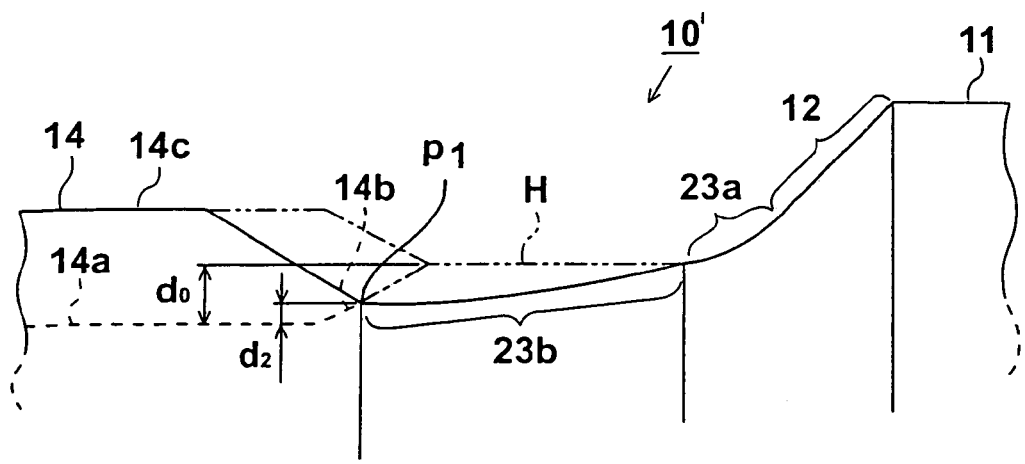
FIG. 3 is an enlarged side view of a shaft of a second embodiment.

In the second embodiment, as shown in FIG. 3, the configuration of the shank 10' between the cut back portion 14b of the splined portion 14 and the small diameter end portion of the tapered portion 12 is different to that of the previous embodiments. Namely, a first curved portion 23a and a second curved portion 23b having a radius of curvature that is larger than that of the first curved portion 23a are interposed and extend continuously in this order between the cut back portion 14b and the tapered portion 12, from the tapered portion 12 side. Namely, two curved portions are provided between the cut back portion 14b and the tapered portion 12.

End portions of the first and second curved portions 23a and 23b at the large diameter portion 11 side are formed so as to have respective radiuses with respect to (distance from) the shaft axis of the shank 10' that are larger than that of the cut back portion 14b.

Moreover, as with the first embodiment, there is a diameter difference d2 between the diameter of a portion of the groove portion 14a of the splined portion 14, excluding the cut back portion 14b, and the diameter of the end portion of the second curved portion 23b near to the splined portion 14.

In FIG. 3, the externality of the conventional shaft, which is configured by splined portion 104 and small diameter portion 103, is indicated by two-dotted chain line. Further, text H indicates the size of the small diameter portion 103 of the conventional shaft. As can be seen from FIG. 3, there is a diameter difference d0 between the diameter of the conventional groove portion of the splined portion and the diameter of the tip portion of the small diameter portion on the splined portion side.

As a result of this, as compared to the conventional shank, the size in the radial direction of the cut back portion 14b is made smaller. Accordingly, strength of a diameter peripheral portion of a spline pitch circle is reduced as compared to the conventional shank, and the splines 14c become easier to bend in a circumferential direction of the shank 10.

Accordingly, with the shaft 1 of the second embodiment, in addition to effects (2), (4) and (5) of the first embodiment, the following effects can be obtained.

(1) In the second embodiment, the cut back portion 14b formed at the end portion of the splined portion 14 at the large diameter portion 11 side and the tapered portion 12 are connected by the continuous extension of both (the plurality of) the first curved portion 23a and the second curved portion 23b. Accordingly, effects (1) and (3) of the first embodiment can be obtained.

Third Embodiment

Next, a detailed explanation will be given of the shaft 1 of a third embodiment of the present invention.

Figure 4:
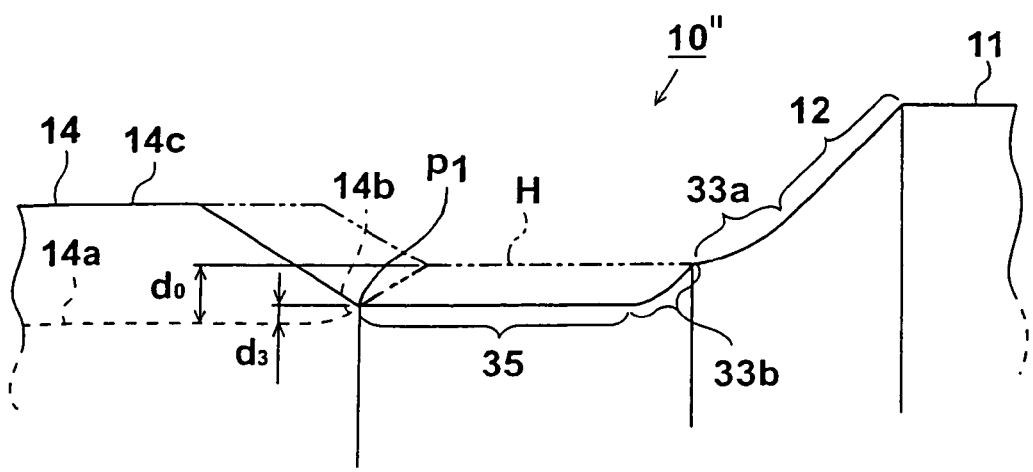
FIG. 4 is an enlarged side view of a shaft of a third embodiment.

In the third embodiment, as shown in FIG. 4, the configuration of the shank 10" between the cut back portion 14b of the splined portion 14 and the small diameter end portion of the tapered portion 12 is different to that of the previous embodiments. Namely, a first curved portion 33a which provides a curved contiguous transition for the tapered portion 12; a second curved portion 33b having a radius of curvature that is different to that of the first curved portion 33a; and a flat portion 35 which is a straight portion having a radius that is constant with respect to the shaft axis, are interposed and extend continuously in this order between the cut back portion 14b and the tapered portion 12, form the tapered portion 12 side. Namely, two curved portions and one straight portion are provided between the cut back portion 14b and the tapered portion 12.

Respective end portions of the first and second curved portions 33a and 33b at the large diameter portion 11 side are formed so as to have larger radiuses with respect to (distance from) the shaft axis of the shank 10" than the cut back portion 14b.

Moreover, as with the first embodiment, there is a diameter difference d3 between the diameter of a portion of the groove portion 14a of the splined portion 14, excluding the cut back portion 14b, and the diameter of the end portion of the second curved portion 33b near to the splined portion 14.

In FIG. 4, the externality of the conventional shaft, which is configured by splined portion 104 and small diameter portion 103, is indicated by two-dotted chain line. Further, text H indicates the size of the small diameter portion 103 of the conventional shaft. As can be seen from FIG. 4, there is a diameter difference d0 between the diameter of the conventional groove portion of the splined portion and the diameter H of the small diameter portion of the conventional shaft on the splined portion side.

Accordingly, with the shaft 1 of the above described third embodiment, in addition to effects (2), (4) and (5) of the first embodiment, the following effects can be obtained:

(1) In the third embodiment, the cut back portion 14b formed at the end portion of the splined portion 14 at the large diameter portion 11 side and the small diameter end portion of the tapered portion 12 are connected by the continuous extension of the flat portion 35, and the first and second curved portions 33a and 33b, from the cut back portion 14b side. Namely, one flat portion and two curved portions continuously connect the cut back portion 14b and the tapered portion 12. Accordingly, effects (1) and (3) of the first embodiment can be obtained.

Fourth Embodiment

Next, the shaft 1 of the fourth embodiment of the present invention will be explained in detail with reference to FIG. 5.

Figure 5:
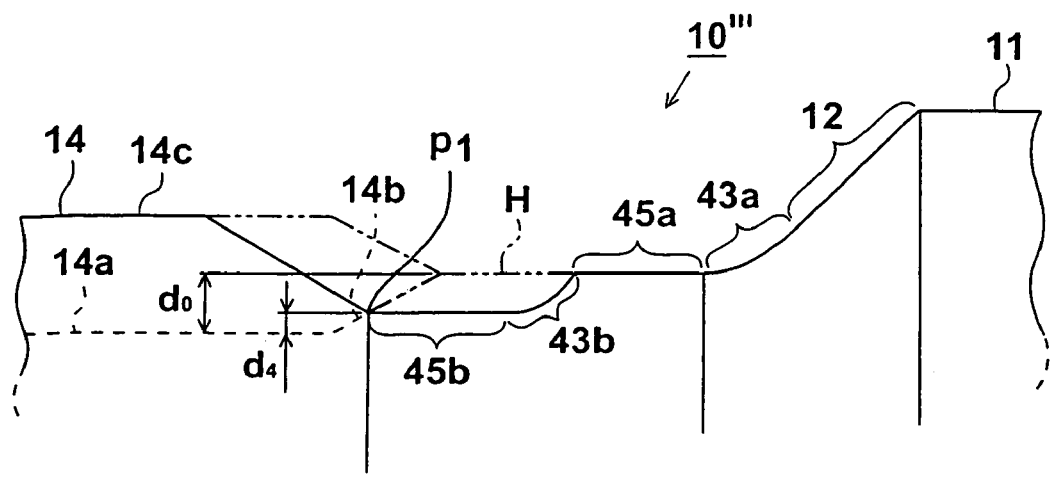
FIG. 5 is an enlarged side view of a shaft of a fourth embodiment.

With the fourth embodiment, as shown in FIG. 5, the configuration of the shank 10''' between the cut back portion 14b of the splined portion 14 and the small diameter end portion of the tapered portion 12 is different to that of the previous embodiments. Namely, a first curved portion 43a, a first flat portion 45a which is a straight portion that is a constant distance from the shaft axis; a second curved portion 43b; and a second flat portion 45b which is a straight portion that is a constant distance from the shaft axis, are interposed and extend continuously in this order between the cut back portion 14b and the tapered portion 12, form the tapered portion 12 side. Namely, two curved portions and two straight portions are provided between the cut back portion 14b and the tapered portion 12.

Respective end portions of the first and second curved portions 43a and 43b at the large diameter portion 11 side are formed so as to have larger diameters with respect to (distance from) the shaft axis of the shank 10''' than the cut back portion 14b.

Moreover, as with the first embodiment, there is a diameter difference d4 between the diameter of a portion of the groove portion 14a of the splined portion 14, excluding the cut back portion 14b, and the diameter of the end portion of the second curved portion 43b near to the splined portion 14.

In FIG. 5, the externality of the conventional shaft, which is configured by splined portion 104 and small diameter portion 103, is indicated by two-dotted chain line. Further, text H indicates the size of the small diameter portion 103 of the conventional shaft.

Accordingly, with the shaft 1 of the fourth embodiment, in addition to effects (2), (4) and (5) of the first embodiment, the following effects can be obtained:

(1) In the fourth embodiment, the cut back portion 14b formed at the end portion of the splined portion 14 at the large diameter portion 11 side and the small diameter end portion of the tapered portion 12 are connected by the continuous extension of the first and second curved portions 43a and 43b, and the first and second flat portions 45a and 45b. Accordingly, effects (1) and (3) of the first embodiment can be obtained.

(2) Moreover, the two straight portions, namely, the first flat portion 45a and the second flat portion 45b, are provided. Accordingly, it is possible to regulate dispersal of stress.

Verification of the Effects of the First to Fourth Embodiments

Next, calculated results for respective ratios of stress generated (hereinafter referred to as "generated stress ratio") in specific portions of the respective shanks 10 of the respective shafts 1 of the first to fourth embodiments and the shank 100 of the conventional example will be explained. Generated stress in specific portions of the shanks 10 and 100 were measured, and ratios of the generated stress in each specified portion of each embodiment and generated stress in corresponding portions of the conventional example were calculated.

It should be noted that in order to make the dimension sizes of the shafts of each embodiment and the conventional example equal, the diameter of outer peripheral of splined portion 14 of the shanks 10 and 100, and the diameter of the large diameter portions 11 and 101 were set so to be equal. Moreover, the axial direction length of the tapered portions 12 and 102, and the angle formed by the tapered portions 12 and 102 with respect to the shaft axis of the shanks 10 and 100 were set to be the same. In addition, the axial direction distance from the large diameter portion to the final end surface (which corresponds to the left end surface of the shank 10 in FIG. 1) of the shanks 10 and 100 was set to be the same, and respective inward joint members having the same size were used for fitting onto the splined portions 14 and 104.

The specified portions of the shanks 10 and 100 were the portions A to C detailed below:

A: The cut back portions 14b and 104b

B: The second curved portions 23b, 33b and 43b

C: The first curved portions 13a, 23a, 33a and 43a and the curved portion 102b

With regard to the second curved portion 13b of the first embodiment, the generated stress has not been estimated. Moreover, since there is no point that corresponds to the second curved portion in the case of the conventional example, measurement has not been conducted for the conventional example either.

FIG. 8 (a) is a chart that shows stress ratios for each specified portion when the stress generated in portion A of the conventional example is set at 1.

In addition, FIG. 8 (b) is a bar graph that shows stress ratios of each specified portion.

As shown in FIG. 8 (a) and FIG. 8 (b), with the first embodiment, as compared to the conventional example, stress is reduced in the specified portion A (the cut back portion 14b).

If the second embodiment is compared to the conventional example, stress in the specified portion C (the first curved portion 23a) and stress in the specified portion A (the cut back portion 14b) are both reduced. Moreover, with the second embodiment, diffusion of stress occurs efficiently in the specified portion B (the second curved portion 23b), as well as in the specified portions A and C.

If the third embodiment is compared with the conventional example, the stress in the specified portion C (the first curved portion 33a) and the stress in the specified portion A (the cut back portion 14b) are both substantially reduced. In particular, the stress generated in the specified portion C (the first curved portion 33a) is reduced. In addition, substantial stress is generated in the specified portion B (the second curved portion 33b). However, this stress is less than the stress of the specified portion A (the cut back portion 104b) of the conventional example.

Comparison of the fourth embodiment and the conventional example shows that stress in the specified portion A (the cut back portion 14b) is reduced. Moreover, with the fourth embodiment, the diffusion of stress occurs efficiently in the specified portion B (the second curved portion 43b), as well as in the specified portions A and C.

Fifth Embodiment

Next, the shaft 1 of a fifth embodiment according to the present invention will be explained in detail with reference to FIG. 6.

Figure 6:
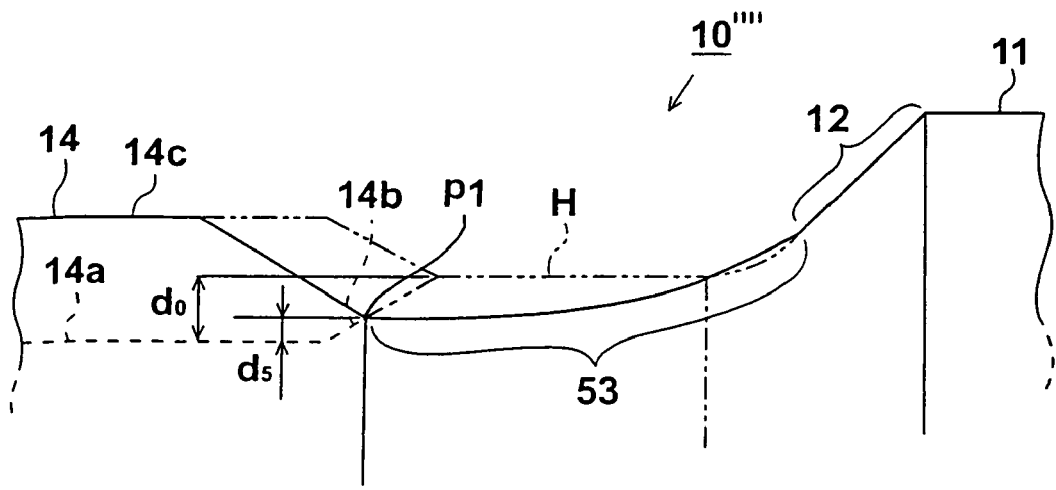
FIG. 6 is an enlarged side view of a shaft of a fifth embodiment.
Figure 9A:
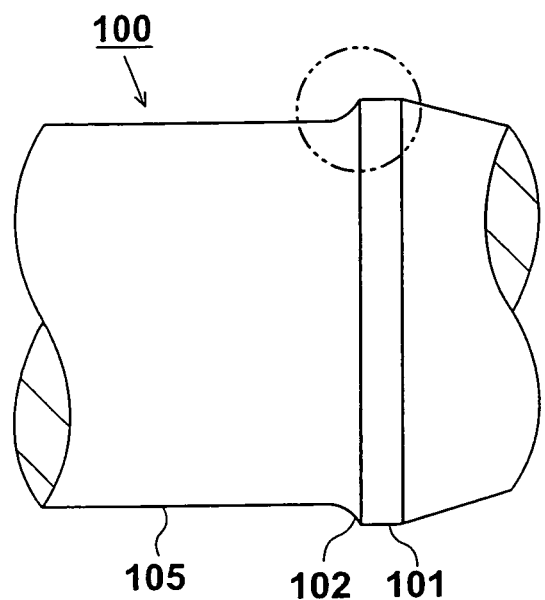
FIG. 9 (*a*) is a side view of a conventional shaft prior to machining.
Figure 9B:
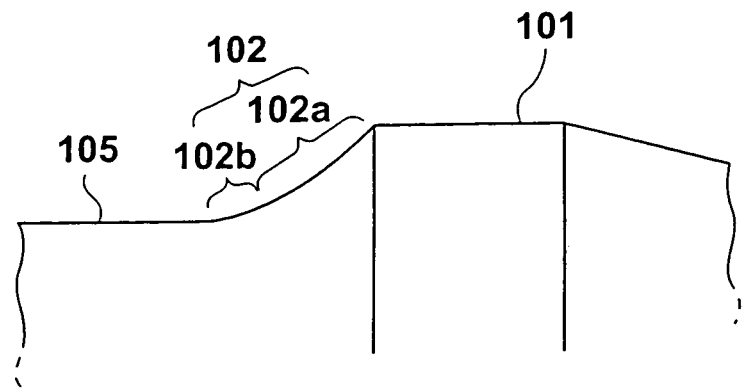
Figure 10A:
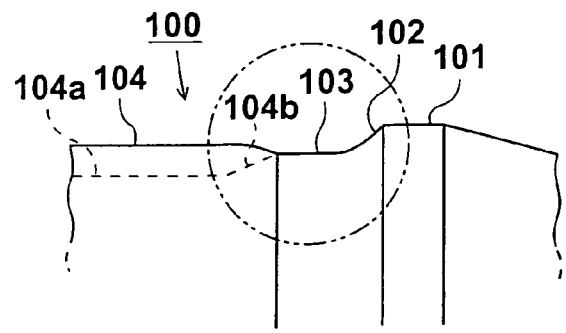
FIG. 10 (*a*) is a enlarged side view of the same conventional shaft.
Figure 10B:
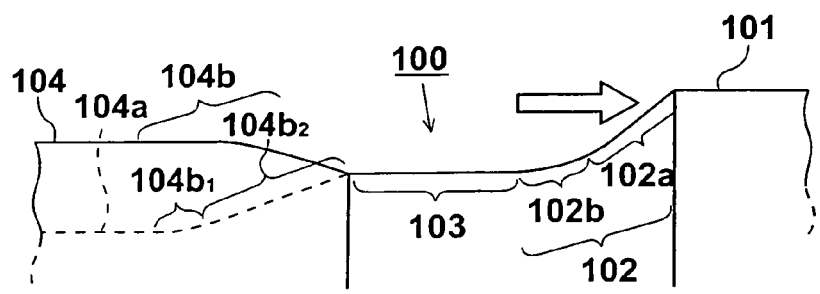
Figure 11:
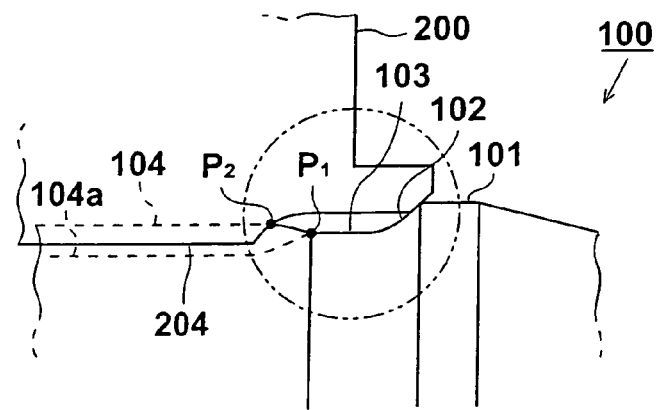
FIG. 11 shows a side view of the conventional shaft when a fitting member has been fitted.

In the fifth embodiment, as shown in FIG. 6, a curved portion 53 extends continuously and is interposed between the cut back portion 14b of the splined portion 14 and the small diameter end portion of the tapered portion 12. In other words, one curved portion is provided between the cut back portion 14b and the tapered portion 12.

An end portion of the curved portion 53 at the large diameter portion 11 side is formed so as to have a larger diameter with respect to (distance from) the shaft axis of the shank 10'''' than the cut back portion 14b.

Moreover, as with the first embodiment, there is a diameter difference d5 between the diameter of a portion of the groove portion 14a of the splined portion 14, excluding the cut back portion 14b, and the diameter of the end portion of the curved portion 53 near to the splined portion 14.

In FIG. 6, the externality of the conventional shaft, which is configured by splined portion 104 and small diameter portion 103, is indicated by two-dotted chain line. Further, text H indicates the size of the small diameter portion 103 of the conventional shaft.

Accordingly, with the shaft 1 of the fifth embodiment, it is possible to obtain the following effects, in addition to the effects (2), (4) and (5) of the first embodiment.

(1) With the fifth embodiment, the cut back portion 14b formed at the end portion of the splined portion 14 at the large diameter portion 11 side and the small diameter end portion of the tapered portion 12 are connected by the single curved portion 53. Accordingly, it is possible to efficiently disperse the stress between the cut back portion 14b formed at the end portion of the groove portion 14a at the large diameter portion 11 side, and the small diameter end portion of the tapered portion 12.

It should be noted that the following separate modifications may also be applied to any of the aforementioned embodiments.

a) With the previous embodiments, up to two straight portions are provided between the cut back portion 14b and the tapered portion 12. However, three or more straight portions may be provided.

b) With the previous embodiments, up to two curved portions are provided between the cut back portion 14b and the tapered portion 12. However, three or more curved portions may be provided.

c) With the previous embodiments, the respective end portions of the curved portions at the larger diameter 11 side were formed to be further from the shaft axis of the shank 10 than the cut back portion 14b. If the end portions are formed in such a manner, the radius of curvature of the curved portions may be set to any value.

d) With the previous embodiments, the straight portion was formed as a flat portion with a constant radius. However, this straight portion may be formed as a tapered portion having a radius that gradually expands from the cut back portion 14b to the large diameter portion 11.

e) With the previous embodiments, when the shaft 1 is manufactured, shot peening is executed after quenching. However, manufacturing may be conducted without executing the shot peening.

f) Further, with the previous embodiments, manufacturing was executed by: forming the splined portion 14 in a predetermined shape; after this, forming the first and second curved portions 13*a* and 13*b* by component rolling; and next, conducting quenching (this specific example is for the first embodiment, but a similar explanation pertains to the other embodiments). However, the manufacturing method is not limited to this. For example, shot peening may be conducted using ultra-hard beads after component rolling.

g) In the previous embodiments, the shaft was embodied using a shaft of a universal joint, namely, a tripod joint. However, the present invention may be applied to universal joints other than the tripod joint, or to a shaft of a torque transmission member having a shank, such as a gear, a pulley, or the like.

h) In the previous embodiments, the large diameter portion 11 is substantially formed at side portion of the splined portion 14 of the shank 10. Further, the tapered portion 12 is provided at the surface of the splined portion 14 side of the large diameter portion 11. However, instead of this, the large diameter portion 11 and the tapered portion 12 may be omitted, and, for example, the shank may be formed with an extended flat portion, like the flat portion 15 shown in FIG. 2. With such a configuration, a portion having the diameter of the flat portion 15 corresponds to the external diameter portion. In this case, for example, the fitting member stopper role may be provided by a circular groove provided in the outer periphery of the shank, and a clip with elastic restoring properties fitted into the circular groove.

What is claimed is:

1. A shaft including a shank comprising:
    a large diameter portion;
    a splined portion engaged with a fitting member, said splined portion including a plurality of splines and a plurality of grooves which diametrically converge at a position spaced from the large diameter portion in the axial direction of the shaft;
    a tapered portion which stops the fitting member and which is located adjacent the large diameter portion, wherein the tapered portion which stops the fitting member includes a curved transitional portion contiguous therewith and reduces the diameter of the shank in the space between the splined portion and the large diameter portion to a minimum diameter at the transitional portion which is greater than that of the splined portion at the position where the plurality of splines and the plurality of grooves diametrically converge; and
    a further portion in the space between the splined portion and the tapered portion, wherein the further portion includes a curved portion reducing the diameter of the shank from that of the minimum diameter of the transitional portion of the tapered portion which stops the fitting member to that of the splined portion at the position where the plurality of splines and the plurality of grooves diametrically converge.

2. The shaft according to claim 1 wherein the further portion consists of a flat portion and another curved portion.

3. The shaft according to claim 2 wherein one end of the flat portion is connected to the transitional portion, one end of the curved portion is connected to the splined portion, and the other ends of the flat and curved portions are connected to each other.

4. The shaft according to claim 2 wherein one end of the curved portion is connected to the transitional portion, one end of the flat portion is connected to the splined portion, and the other ends of the flat and curved portions are connected to each other.

5. The shaft according to claim 1 wherein the further portion consists of another curved portion.

6. The shaft according to claim 1 wherein the further portion consists of two flat portions and another curved portion.

7. A shaft including a shank comprising:
    a large diameter portion;
    a splined portion engaged with a fitting member, said splined portion including a plurality of splines and a plurality of grooves which diametrically converge at a position spaced from the large diameter portion in the axial direction of the shaft;
    a tapered portion which stops the fitting member and which is located adjacent the large diameter portion, wherein the tapered portion which stops the fitting member includes a curved transitional portion contiguous therewith and reduces the diameter of the shank in the space between the splined portion and the large diameter portion to a minimum diameter at the transitional portion which is greater than that of the splined portion at the position where the plurality of splines and the plurality of grooves diametrically converge; and
    a further portion in the space between the splined portion and the portion which stops the fitting member, wherein the further portion is separated from the curved transitional portion by at least a change in slope and reduces the diameter of the shank from that of the minimum diameter of the transitional portion of the tapered portion which stops the fitting member to that of the splined portion at the position where the plurality of splines and the plurality of grooves diametrically converge.

* * * * *